United States Patent
Hiestand

[15] 3,635,481
[45] Jan. 18, 1972

[54] CHUCK FOR MACHINE TOOLS

[72] Inventor: Karl Hiestand, Pfullendorf, Germany

[73] Assignee: SMW, Spanneinrichtungen, Schneider, Manz & Weisshaupt OHG, Friedrichshafen, Germany

[22] Filed: Oct. 14, 1969

[21] Appl. No.: 866,284

[30] Foreign Application Priority Data

Oct. 16, 1968 Germany .................. P 18 03 262.7

[52] U.S. Cl. ........................................................ 279/115
[51] Int. Cl. ........................................................ B23b 31/16
[58] Field of Search ..................... 279/110, 114, 115, 121

[56] References Cited

UNITED STATES PATENTS 2,602,673  7/1952  Deuring et al. .................. 279/121 X

FOREIGN PATENTS OR APPLICATIONS 380,720  3/1932  Great Britain ........................ 279/114
824,725  12/1951  Germany ............................. 279/114

Primary Examiner—Andrew R. Juhasz
Assistant Examiner—James F. Coan
Attorney—Ernest F. Marmorek

[57] ABSTRACT

A chuck for centrally chucking workpieces on a machine tool, comprising: a chuck body with radially extending grooves therein, tensioning jaws respectively received in the grooves and provided with gearteeth, a threaded spindle in the body, the chuck body having an angular cross section in planes through the axis of rotation thereof so as to confine a recess, a ring rotatably arranged in the recess and provided with teeth in meshing engagement with the threaded spindle, and a plurality of follower means mounted on the ring and provided with teeth respectively in meshing engagement with the teeth of the jaws for radially displacing the same upon rotation of the spindle.

4 Claims, 3 Drawing Figures

PATENTED JAN 18 1972
3,635,481
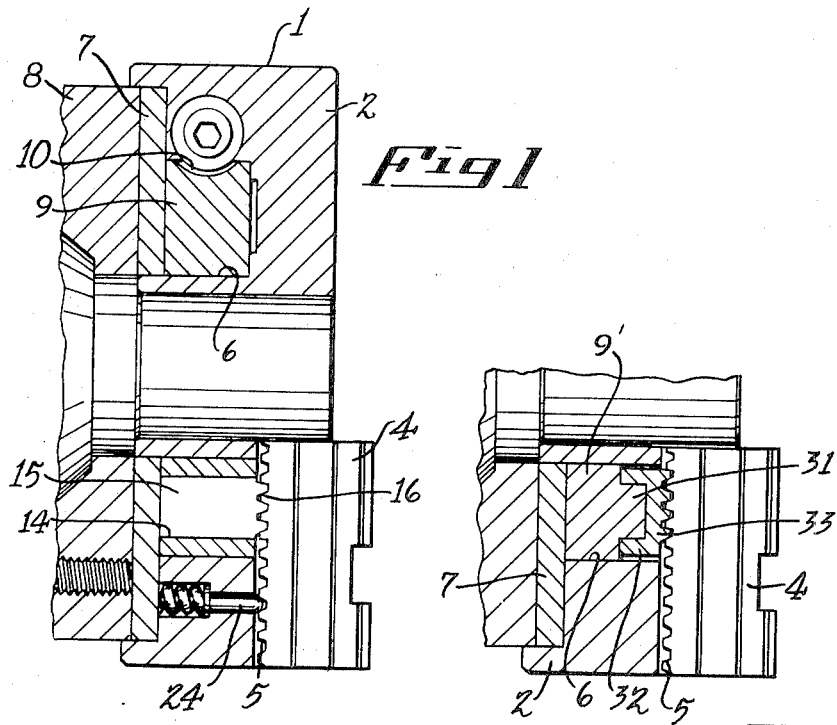
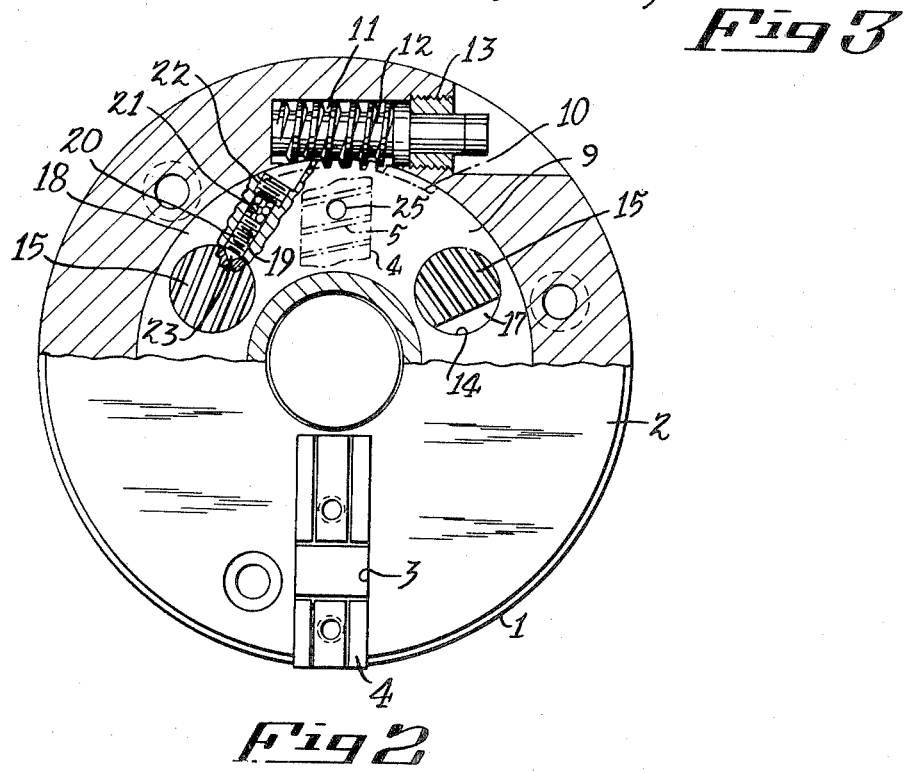

CHUCK FOR MACHINE TOOLS

BACKGROUND OF THE INVENTION

The present invention relates to a chuck for machine tools for centrally mounting, clamping, or chucking workpieces. Ordinarily, the chuck comprises a faceplate or chuck body with radially arranged grooves, and tensioning jaws inserted therein which may be radially displaced by a threaded spindle via intermediate members. More specifically, the invention concerns a particularly advantageous construction of a manually operable chuck to be used preferably with lathes. Chuck which most commonly have three tensioning jaws serve primarily for chucking workpieces during machining thereof and serve for centering the workpieces. They have been known as pressure operable chucks and as manually operable chucks in a variety of embodiments for a long time. With manually operable chucks in which the tensioning force is created by rotating a manually operable key and by intermediate members of various designs is transferred to the tensioning jaws, the intermediate transferring members consist frequently of spirals provided in rotatable disks, eccentrically journaled arches, or coupled gear racks with wedge-shaped teeth. It has also previously been suggested to provide threaded spindles interconnected by bevel gears or threaded disks for transmitting the tensioning force.

All these above-mentioned well-known chucks have the common disadvantage that their faceplates or chuck bodies are complicated because of the necessity of arranging the force transmitting members therein. The bodies are therefore very difficult to machine because of the recesses provided in the body and leading from the outside into the interior of the body. Furthermore, with such heretofore known chucks it is frequently necessary to make the chuck body in two parts for reasons of manufacture and assembly. The manufacture of such chucks is very expensive since the recesses and grooves can only be produced by milling, thus making an economic production impossible. Furthermore, it is very difficult to seal the recesses for the bearings and a number of smaller elements to be inserted therein. It is, therefore, almost impossible to prevent the penetration of dirt, dust, cutting solution, lubricants, and other foreign material. Considerable wear and tear and frequent interruptions occur, which also may be brought about by the frequently prevailing line contact between the power transmitting members and the high specific pressure resulting therefrom.

It is, therefore, an object of the present invention to provide a chuck for machine tools for centrally chucking workpieces which will avoid the disadvantages outlined above.

More specifically, it is an object of the present invention to provide a manually operable chuck which can be produced at low cost, even when the series to be produced consists of only a relatively small number of chucks.

Still another object of the present invention consists in the provision of a manually operable chuck in which all elements necessary for the transmission of the tensioning force are arranged in the body or faceplate of the chuck which is closed in itself and relatively small so that the penetration of dirt and interruptions caused thereby can be prevented.

BRIEF SUMMARY OF THE INVENTION

The above-mentioned objects have realized in accordance with the present invention by providing the body or faceplate of the chuck with an angular or U-shaped cross section thus creating a recess, and by inserting into the recess of the body, which preferably may be closed by a disk or cover plate, a rotatable ring which is provided with teeth and which cooperates with a threaded spindle held in the chuck body. The ring is provided with follower members meshing with wedge-shaped teeth of the jaws for radially displacing the same. The follower members may be formed by extensions of the ring, arranged parallel to the axis of the ring, preferably of circular cross section in the form of a pin. Each tensioning jaw has associated therewith at least one extension.

In accordance with a particularly advantageous embodiment, the follower members may be formed by bolts rotatably inserted into the ring in axis-parallel circular recesses thereof, or by bushings or sleeves rotatably mounted on extensions of the ring, while again each tensioning jaw has at least one bolt or bushing associated therewith. In order to keep the specific surface pressure of the parts meshing with each other during the power transmission relatively small, it is very advantageous to provide the bolts inserted into recesses of the ring, or the sleeves or bushings mounted on extensions of the ring, with follower teeth in the form of straight or rounded teeth on that side thereof which faces and meshes with the jaws.

It is, furthermore, very advantageous to insert the adjusting spindle into a recess of the body of the chuck in a rotatable and nondisplaceable manner, said recess being preferably directed tangentially to the rotatable ring. The ring is provided with teeth on its circumferential surface, on one of its end faces, or on an extension connected to the ring, said teeth meshing with the threaded spindle. Preferably, the teeth are provided only on a portion of the circumference. It is, of course, possible to provide the adjusting spindle in a different manner in the body or faceplate of the chuck and to let the spindle either act directly or through intermediate members onto the rotatably journaled ring.

According to another feature of the present invention, the bolts inserted into the recesses of the ring may in turn be provided with a recess on that side thereof which faces the jaws, for adjustment purposes, the recesses in the bolts being arranged at an angle with respect to the teeth thereof. This angle corresponds to the pitch angle of the teeth of the jaws meshing with the bolts. It is, also, possible to provide the ring with spring latches in the form of an axially displaceable pins which respectively coact with the bolts and which is axially displaceable against the force of the spring for fixing the position of the rotatably journaled bolts in the meshing position of the teeth.

BRIEF DESCRIPTION OF THE DRAWING

The chuck in accordance with the present invention is illustrated in the attached drawing, in which:

FIG. 1 represents an axial section through the chuck;
FIG. 2 shows the chuck according to FIG. 1 in a partial section and in front view;
FIG. 3 shows a modification of the chuck of FIG. 1.

DETAILED DESCRIPTION OF A PREFERRED EMBODIMENT

Referring now to the drawing in detail, and FIGS. 1 and 2 in particular, the manually operable chuck 1 for clamping workpieces, especially on machine tools, comprises a faceplate or chuck body 2, radially arranged grooves 3 provided in the faceplate 2, tension jaws for acting upon the workpiece /not shown/, and an adjusting spindle 12 by means of which the tensioning force is transferred to the jaws 4 through the invention of intermediate members. As clearly shown in FIG. 1, the faceplate 2 has a U-shaped cross section so that the legs thereof form a recess 6 which can be closed by a coverplate or lid 7 and into which is inserted a ring 9. Ring 9 is rotatably arranged within the recess 6 and is provided with outer teeth 10 on a portion of the outer circumferential surface of ring 9 and in driving connection with the adjusting spindle 12.

Furthermore, ring 9 is provided with recesses 14 which are in the form of bores and extend parallel to the axis of rotation of the chuck. Bolts 15 are inserted into these recesses 14 and are equipped with teeth 16 on those sides thereof which face the jaws 4. Teeth 16 mesh with teeth 5 of the jaws 4 which may represent the actual tensional jaws or a support therefor. Incidentally, chuck 1 can be connected to machine tool by means of a receiving disk 8.

An alternative arrangement is shown in FIG. 3. Instead of with bolts 15, the ring 9' rotatably journaled in recess 6 is provided with extensions 31 having rotatably mounted thereon bushings 32.

The faces of the bushings 32 facing the jaws 4 are again provided with teeth 33 which mesh with the teeth 5 of the jaws 4. In still another embodiment, the means for moving the jaws 4 comprise pins 25 which are rigidly connected with the ring 9 and which drivingly cooperate with the teeth 5 of the jaws 4. Teeth 5 are wedge shaped.

Referring to the upper portion of FIG. 9 the space 9 the spindle 12 is closed by a plug 13 in a dustproof manner. When the spindle 12 is rotated by hand by means of a key /not shown/ the ring 9/ /or 9' respectively/ is likewise rotated since the spindle meshes with the teeth 10 of the ring 9 /or 9'/. The bolts 15 which are rotatably inserted into the recesses 14 of the ring 9, or in the embodiment of FIG. 3 the bushings 32 which are rotatably mounted on the extensions 31 of the ring 9', are moved in circumferential direction and thereby simultaneously executed a rotating movement about their axes since they are drivingly connected to the jaws 4 via the teeth 16. With these movements, depending on the direction of rotation of the ring 9 /or 9'/ and depending on the design of the teeth 5 and 16 /or 33/ the jaws are advanced by means of the teeth 16 /or 33/.

Furthermore, since the teeth 5 of the jaws 4 have a pitch angle selected in conformity with requirements, the jaws are moved inwardly or outwardly. As mentioned above, instead of the teeth 5 and 16 /or 33/, pins 25 may be used if the forces to be transmitted are very small. As shown in the drawing, these pins 25 are directly connected to the ring 9 and have the desired effect of displacing the jaws 4 via the teeth 5. However, since with such chucks it is very often necessary to provide larger surfaces in order to prevent a high and nonpermissible specific pressure, it is advantageous to provide the teeth 16 or 33 on rotatably journaled elements, such as the bolts 16 or bushing 32, in order to compensate for the change in location caused by the rotation of the ring 9, or 9' respectively.

The location of the jaws 4 in radial direction can be fixed by a spring latch 24. In order to facilitate the insertion of the jaws 4, and more specifically the meshing of the teeth 5 with the teeth 16 of the bolts 15, a recess 17 is provided in the teeth 16. Advantageously, the recess 17 is arranged at an angle with respect to the teeth 16, said angle corresponding to the pitch angle of the teeth 5 of the jaws 4 meshing with the bolt 15. It is, however, also possible to provide a spring latch 18 for purposes of fixing the bolts 15 which are rotatably journaled in the recesses 14 of the ring 9, in the meshing position with teeth 5. The spring latch 18 is formed by a pin 20 inserted into a recess 19 of ring 9. The pin 20 is being pressed into a recess in bolt 15, which may be conical, by means of a spring 21 resting against a plug 22 screwed into recess 19. When the jaws 4 are removed from the chuck, the bolts 15 maintain their position so that the reinsertion of the jaws 4 is facilitated.

As will be evident from the above description, the chuck 1 consists of only a few elements inserted into the faceplate 2, which elements transfer the tensioning force exerted by the adjusting spindle 12 in a very reliable manner onto the jaws 4. Dirt or other foreign material are almost prevented from penetrating into the space housing the spindle, the bearings of the ring 9, and the bolts 15 or bushings 32, since the radially extending grooves 3 provided in the faceplate 2 are tightly closed by the jaws 4, and the recess 6 by the lid 7.

The chuck designed in accordance with the present invention is characterized by simple construction, a very economical manufacture, and forms a closed, compact unit. In view of the fact that the body of the chuck is provided with an angular or U-shaped recess which can be closed in a simple manner by a lid, for receiving the power transmitting members in the form of a ring rotatable by a spindle, ring is provided with follower members meshing with wedge-shaped teeth of the jaws for radially displacing the same the power transmitting members are as far as possible protected from dirt and other foreign material. The wear of the cooperating power transmitting members thus is very small, since outer influences can not produce malfunctions. Furthermore, since the power-transmitting members are simple in design, the production costs can be held to a minimum.

Furthermore, a side from low expense, the structure of the chuck in accordance with the invention is considerably smaller than that of heretofore known chucks. The reason for this lies in the fact that the axial dimension of the chuck is very small, since the follower members cooperating with the jaws are journaled directly in the ring or are mounted thereon, the ring in turn being inserted into the body of the chuck.

Still another advantage of the invention consists in that upon rotation of the spindle for instance for tensioning a workpiece, no rotation of the chuck occurs in view of the provision of the spindle directly in the body of the chuck. This has been frequently a problem with prior art embodiments.

While the invention has been explained and described with the aid of particular embodiments thereof, it will be understood that the invention is not limited thereby and that many modifications retaining and utilizing the spirit thereof without departing essentially therefrom will occur to those skilled in the art in applying the invention to specific operating environments and conditions. It is therefore contemplated by the appended claims to cover all such modifications as fall within the scope and spirit of the invention.

I claim:

1. A chuck for centrally chucking workpieces on a machine tool, comprising:
    a chuck body with radially extending grooves therein, tensioning jaws respectively received in said grooves and provided with gearteeth, a threaded spindle in said body, said chuck body having an angular cross section in planes through the axis of rotation of said chuck body so as to confine a recess, a ring rotatably arranged in said recess and provided with teeth in meshing engagement with the threaded spindle, and a plurality of follower means mounted on said ring and provided with teeth respectively in meshing engagement with the teeth of said jaws for radially displacing the same upon rotation of said spindle, each of said follower means including a sleeve rotatably mounted on said ring, at least one follower means being associated with each tensioning jaw, said bolts being provided with a plurality of extensions, and said sleeves being respectively rotatably mounted on said extensions.

2. A chuck for centrally chucking workpieces on a machine tool, comprising: a chuck body with radially extending grooves therein, tensioning jaws respectively received in said grooves and provided with gearteeth, a threaded spindle in said body, said chuck body having an angular cross section in planes through the axis of rotation of said chuck body so as to confine a recess, a ring rotatably arranged in said recess and provided with teeth in meshing engagement with the threaded spindle, and a plurality of follower means mounted on said ring and provided with teeth respectively in meshing engagement with the teeth of said jaws for radially displacing the same upon rotation of said spindle, said ring being provided with a plurality of circular recesses arranged parallel to the axis of rotation of said chuck body, each of said follower means including a bolt respectively rotatably mounted in said recesses of said ring, at least one follower means being associated with each tensioning jaw, and said bolts being each provided with a cutout at least on that side thereof which faces the adjacent jaw for aligning said bolts.

3. A chuck according to claim 2, wherein said cutouts are arranged at an angle with respect to the teeth on the respective bolt, said angle equaling the pitch angle of the teeth of the respective jaw meshing with the teeth on the bolt.

4. A chuck for centrally chucking workpieces on a machine tool, comprising: a chuck body with radially extending grooves therein, tensioning jaws respectively received in said grooves and provided with gearteeth, a threaded spindle in said body, said chuck body having an angular cross section in planes through the axis of rotation of said chuck body so as to confine a recess, a ring rotatably arranged in said recess and provided with teeth in meshing engagement with the threaded spindle, and a plurality of follower means mounted on said ring and provided with teeth respectively in meshing engagement with the teeth of said jaws for radially displacing the same upon rotation of said spindle, said ring being provided with a plurality of circular recesses arranged parallel to the axis of rotation of said chuck body, each of said follower means including a bolt respectively rotatably mounted in said recesses of said ring, at least one follower means being associated with each tensioning jaw, and said ring being provided with resilient latch means for arresting said rotatably journaled bolts in their respective meshing positions, said resilient latch means comprising pin means axially displaceably inserted into the respective bolt and spring means urging the respective pin into engagement with the respective bolt.

* * * * *